United States Patent
Miyazaki (10) Patent No.: US 7,324,742 B2
(45) Date of Patent: Jan. 29, 2008

(54) VIDEO-SIGNAL PROCESSING APPARATUS AND METHOD, RECORDING MEDIUM AND PROGRAM

(75) Inventor: Shinichiro Miyazaki, Kanagawa (JP)

(73) Assignee: Sony Corporation (JP)

( * ) Notice: Subject to any disclaimer, the term of this patent is extended or adjusted under 35 U.S.C. 154(b) by 1102 days.

(21) Appl. No.: 10/177,519

(22) Filed: Jun. 21, 2002

(65) Prior Publication Data

US 2003/0007090 A1    Jan. 9, 2003

(30) Foreign Application Priority Data

Jun. 25, 2001  (JP)  ............ P2001-191257

(51) Int. Cl.
*H04N 7/01*    (2006.01)
(52) U.S. Cl. .............. 386/131; 386/108; 386/95; 386/68; 386/37; 386/90
(58) Field of Classification Search ........... 386/131, 386/37, 90, 95
See application file for complete search history.

(56) References Cited

U.S. PATENT DOCUMENTS

| | | | | |
|---|---|---|---|---|
| 5,497,199 A | * | 3/1996 | Asada et al. ............ | 348/446 |
| 5,917,552 A | * | 6/1999 | Van Court ............... | 348/558 |
| 6,118,488 A | * | 9/2000 | Huang .................... | 348/452 |
| 6,895,172 B2 | * | 5/2005 | Itani et al. .............. | 386/95 |
| 2001/0002851 A1 | * | 6/2001 | Shimada et al. ....... | 348/423.1 |
| 2002/0101537 A1 | * | 8/2002 | Basson et al. .......... | 348/465 |

FOREIGN PATENT DOCUMENTS

JP          10-304358          11/1998

* cited by examiner

*Primary Examiner*—Thai Q. Tran
*Assistant Examiner*—Helen Shibru
(74) *Attorney, Agent, or Firm*—Lerner, David, Littenberg, Krumholz & Mentlik, LLP (57) ABSTRACT

Apparatus to suppress image deterioration in a data, broadcast thereby providing a display with quality, wherein a video signal separated from a reception signal by a demultiplexer is outputted to a converter section through an MPEG decoder section. When the video signal is a data broadcast and in a 480I signal format, a CPU controls a converter section to perform size-scaling on the video signal and to convert it into a 480p signal format. A data processing section generates a video signal having a 480p signal format of a corresponding character or figure, under control of the CPU, on the basis of a data signal. A synthesizer section synthesizes together the two video signals processed by the converter section and data processing section and inputs the synthesized signal to a D/A converter. The D/A converter converts an input video signal into an analog signal and outputs it to a display unit.

6 Claims, 7 Drawing Sheets

VIDEO-SIGNAL PROCESSING APPARATUS AND METHOD, RECORDING MEDIUM AND PROGRAM

BACKGROUND OF THE INVENTION

1. Field of the Invention

The present invention relates to a video-signal processing apparatus and method, recording medium and program, and more particularly to a video-signal processing apparatus and method, recording medium and program adapted for display with quality by suppressing against image deterioration in the case a reception signal contains a data broadcast signal.

2. Description of the Related Art

With reference to FIG. 1, a conventional digital broadcast system will be explained.

In the case of using a high-vision television receiver or double-speed-conversion television receiver in combination with a digital tuner, when the digital tuner outputs a 480I broadcast signal to the television receiver, the television receiver format-converts the 480I broadcast signal into a high-vision signal (e.g. 720p, 1080I) or double-speed signal (e.g. 480p, 960I) with an incorporated double-speed conversion function, thereby outputting and displaying an image with quality.

In the meanwhile, in the digital broadcast system utilizing satellites or the like, there exist a broadcast having only a video signal (moving image) to be displayed over the entire screen (ordinary broadcast) and a data broadcast having character or figure data signal to be displayed in combination with a video signal.

Figure 1A:
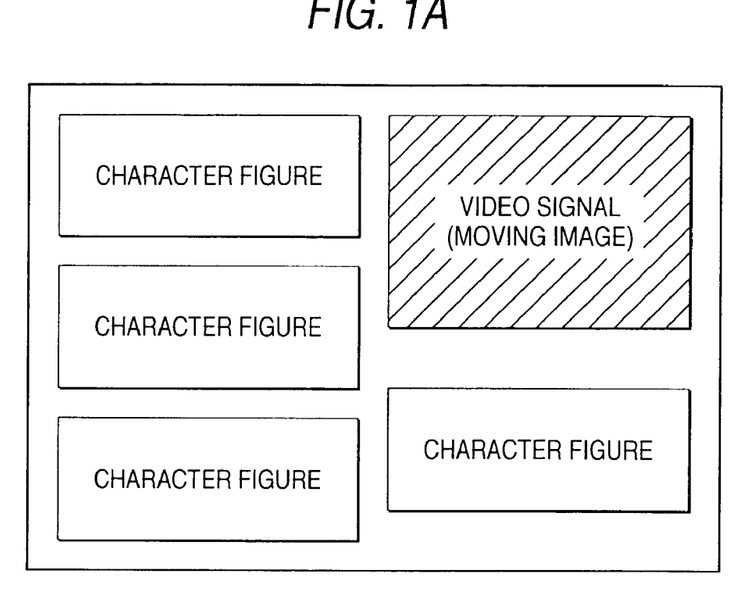
FIG. 1 is a figure explaining an on-screen arrangement of a data broadcast and an image quality deterioration in the conventional.

In a data broadcast, the determination whether to broadcast a video signal in order for display in combination with a data signal or not is relied upon the broadcaster. At present, it is a practice for the broadcaster to broadcast many data-broadcast programs so that they are displayed by a video signal mixed in a character or figure data signal, as shown in FIG. 1A. In this case, the video signal is displayed in a reduced size (in the case of FIG. 1, the video-signal screen size (horizontal and vertical sizes) is a half of that of upon the ordinary broadcast).

In the meanwhile, the data-broadcast signal is broadcasted usually as a 480I signal. As a result, the video signal of data broadcast is processed for being reduced in its screen size in a digital tuner, followed by being format-converted from 480I into 480p or 960I in a television receiver. Namely, the video signal, thinned out in the number of both horizontal pixels and vertical lines to a half in order for screen-size reduction in the digital tuner, is further subjected to double-speed conversion in the television receiver.

The algorithm for double-speed conversion in nature is to optimize a video signal in a standard screen size of 480I without size reduction (720 dots×480 lines). Consequently, in case double-speed conversion is made on a size-reduced video signal, there is a fear to cause image deterioration, e.g. displaying a slant line-a in a step form, as shown in FIG. 1B.

Figure 1B:
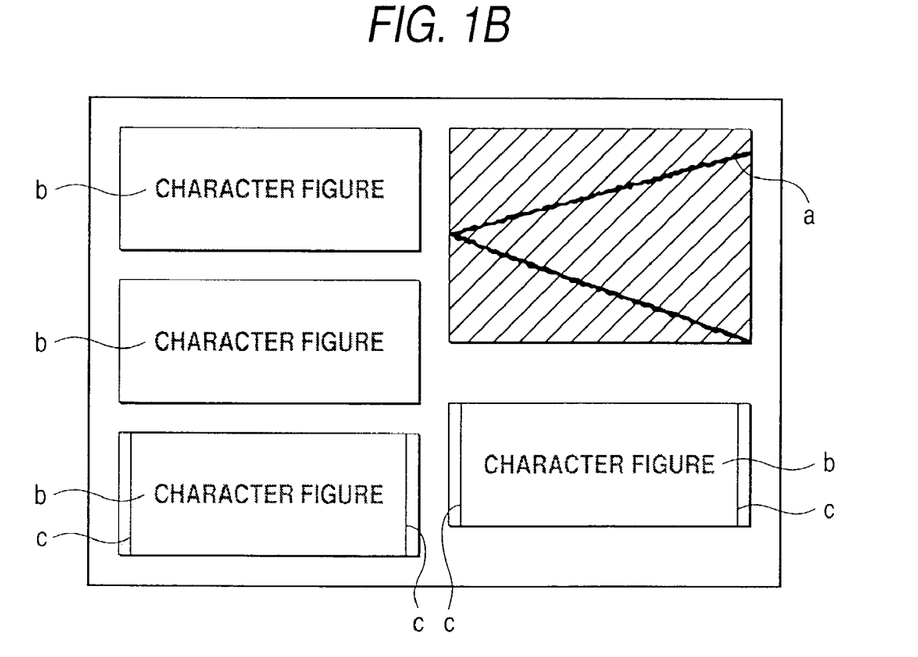

Furthermore, when a character or figure data signal is displayed, e.g. as a 960I signal, line flicker takes place on a character-bas shown in FIG. 1B. Meanwhile, because the format conversion (double-speed conversion function) on a television receiver is designed to optimize video signals, there is a fear that a character or figure image based on a data signal be displayed unnaturally, e.g. with excessive edge-c emphasis as shown in FIG. 1B.

SUMMARY OF THE INVENTION

The present invention is to suppress against image deterioration in data broadcast thereby providing display with quality.

A video signal processing apparatus of the present invention comprises: first determining means for determining whether the reception signal contains a data broadcast signal or not; second determining means for determining whether a video signal of the reception signal is a predetermined formatted signal or not; converting means for converting a format of the video signal of the reception signal in the case that the first determining means determines that the reception signal contains the data broadcast signal and the second determining means determines that the video signal of the reception signal is the predetermined formatted signal; and synthesizing means for synthesizing the video signal format-converted by the converting means with a signal based on a corresponding data broadcast signal.

The first determining means may determine whether the reception signal contains the data broadcast signal or not depending upon an instruction signal instructed based on a user operation or upon size-reduction information of a video signal of the reception signal.

The predetermined formatted signal may be a 480I signal.

A video signal processing method of the invention comprises: a first determining step of determining whether the reception signal contains a data broadcast signal or not; a second determining step of determining whether a video signal of the reception signal is a predetermined formatted signal or not; a converting step of converting a format of the video signal of the reception signal in the case that the first determining step determines that the reception signal contains the data broadcast signal and the second determining step determines that the video signal of the reception signal is the predetermined formatted signal; and a synthesizing step of synthesizing the video signal format-converted by the converting step with a signal based on a corresponding data broadcast signal.

A program for a recording medium of the invention comprises: a first determining step of determining whether the reception signal contains a data broadcast signal or not; a second determining step of determining whether a video signal of the reception signal is a predetermined formatted signal or not; a converting step of converting a format of the video signal of the reception signal in the case that the first determining step determines that the reception signal contains the data broadcast signal and the second determining step determines that the video signal of the reception signal is the predetermined formatted signal; and a synthesizing step of synthesizing the video signal format-converted by the converting step with a signal based on a corresponding data broadcast signal.

A program of the invention for a computer for processing a video signal contained in a reception signal and outputting a processed signal to a unit having a double-speed conversion function, is to execute: a first determining step of determining whether the reception signal contains a data broadcast signal or not; a second determining step of determining whether a video signal of the reception signal is a predetermined formatted signal or not; a converting step of converting a format of the video signal of the reception signal in the case that the first determining step determines that the reception signal contains the data broadcast signal and the second determining step determines that the video signal of the reception signal is the predetermined formatted signal; and a synthesizing step of synthesizing the video signal format-converted by the converting step with a signal based on a corresponding data broadcast signal.

In the video signal processing apparatus and method, recording medium and program of the present invention, a video signal in a data-broadcast predetermined format is converted into another format and then synthesized with a signal based on a corresponding data broadcast signal. Accordingly, it is possible to suppress against image deterioration and provide display with quality in data broadcast.

DETAILED DESCRIPTION OF THE PREFERRED EMBODIMENTS

The embodiments of the present invention will now be explained with reference to the drawings.

Figure 2:
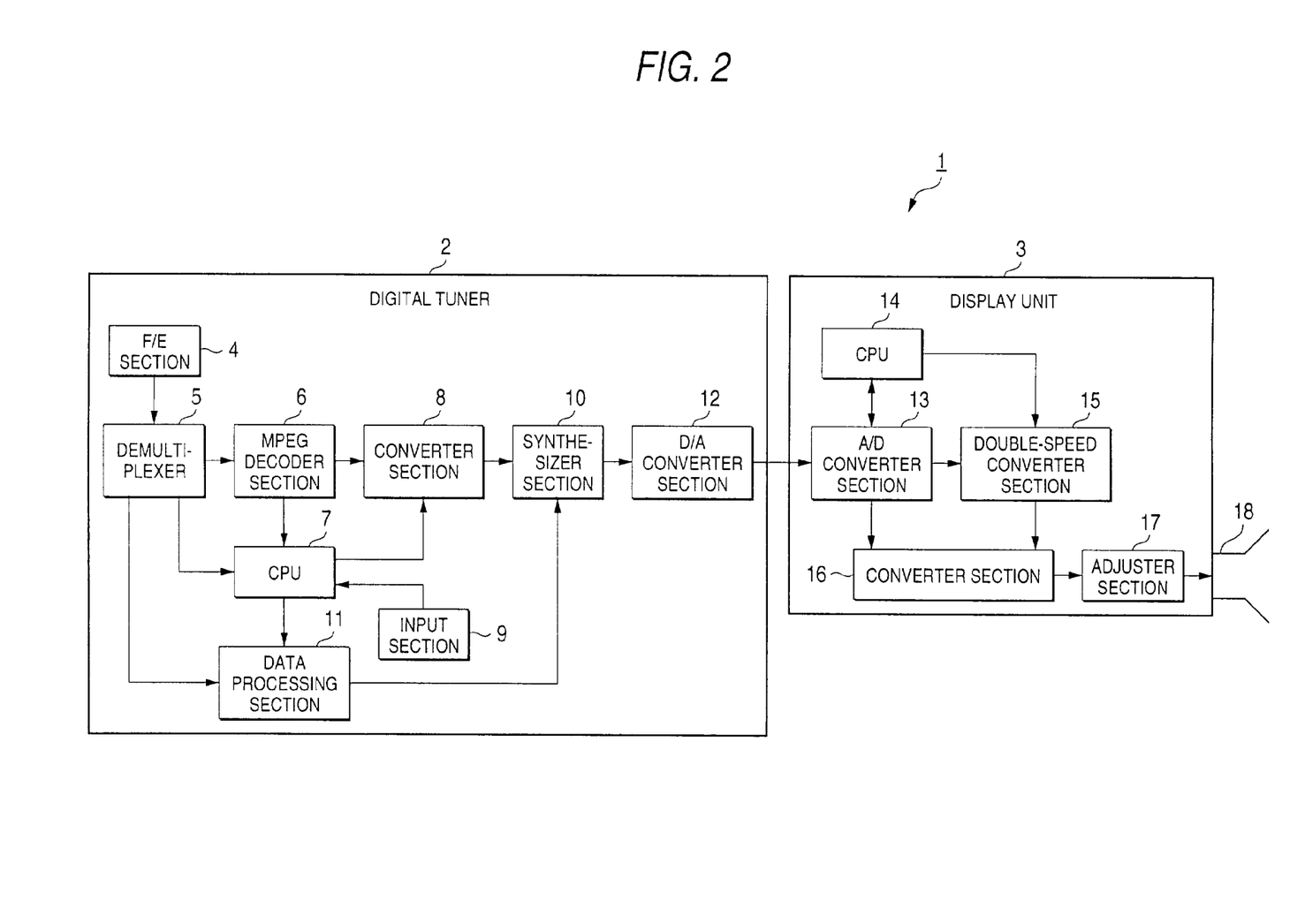
FIG. 2 is a diagram showing a configuration example of a television receiver to which the present invention is applied.

FIG. 2 shows a configuration example of a television receiver 1 to which the invention is applied. The television receiver 1 is configured with a digital tuner 2 and a display unit 3, as respective independent units. The digital tuner 2 and the display unit 3 are connected together by a D-terminal.

First, explained is the digital tuner 2 configured, for example, as a set top box (STB) or set back box (SBB). An F/E (Front End) section 4 channel-selects and demodulates a broadcast signal received through a not-shown antenna, and outputs it as a transport stream (hereinafter, referred to as TS) to a demultiplexer 5.

The demultiplexer 5 separates the supplied TS into PES (Packetized Elementary Stream)-based video of a specified channel, audio, data signals and the information signals of these signals. Among these, the video signal is outputted to an MPEG (Moving Picture Experts Group) decoder section 6. The information signal is outputted to a CPU (Central Processing Unit) 7 and the data signal is to a data processing section 11. Incidentally, the audio signal is outputted to and processed in a not-shown audio decoder section.

The MPEG decoder section 6 decodes the video signal into a base band according to a signal format thereof and outputs it to a converter section 8. Note that, concerning the signal format, there are roughly four format definitions of 1080I, 720p, 480p and 480I in the BS digital broadcast. Herein, the numeral represents the number of scanning lines while I denotes an interlace scheme and p a progressive scheme, respectively. Meanwhile, the MPEG decoder section 6 outputs an information signal on a signal format concerning the video signal to the CPU 7.

The CPU 7 controls the various sections correspondingly to an input from an input section 9 for outputting a corresponding signal to a user operation. Meanwhile, the CPU 7 determines whether or nor the video signal is a data-broadcast video signal, depending on an information signal of the video signal inputted from the demultiplexer 5 or a user instruction signal inputted through the input section 9. Furthermore, the CPU 7 determines whether or not the video signal has a signal format of 480I, depending on a signal-formatted information signal on the video signal inputted by the MPEG decoder section 6.

The input section 9 is structured with various switches, buttons, a remote controller and the like, to output a signal corresponding to a user operation. For example, in case the user presses a D-button in order to instruct for receiving a data broadcast, an instruction signal for data broadcast reception is outputted to the CPU 7.

The converter section 8 size-reduces a video signal inputted by the MPEG decoder section 6 according to a control signal from the CPU 7, and converts a 480I signal into a signal format of 480p and outputs it to a synthesizer section 10. When there is no conversion instruction from the CPU 7, the converter section 8 outputs the input video signal, as it is, to the synthesizer section 10.

The data processing section 11 including a graphic generator generates a video signal of a corresponding character, figure or the like under control of the CPU 7 on the basis of a data signal inputted from the demultiplexer 5, and outputs it to the synthesizer section 10.

The synthesizer section 10 synthesizes together a video signal inputted from the converter section 8 and a video signal inputted from the data processing section 11, and outputs the synthesized video signal to a D/A converter section 12.

The D/A converter section 12 converts the video signal inputted from the synthesizer section 10 into an analog signal and outputs it to a display unit 3 through the D-terminal.

Next, the display unit 3 will be explained. The A/D converter 13 converts an input analog signal into a digital signal.

The CPU 14 detects a signal format of an input signal, and controls the A/D converter 13 depending upon a result of the detection. Based on the control, the A/D converter section 13 outputs an input video signal, when it is a 480I formatted signal, to a double-speed converter section 15. When it is another formatted (1080I, 720p or 480p formatted) signal than 480I, output is to the converter section 16.

The double-speed converter section 15 double-speed-converts a 480I signal inputted from the A/D converter 13 and outputs the converted signal to the converter section 16. The double-speed converter section 15 converts a 480I-formatted signal into a 480p- or 960I-formatted signal by a DRC (Digital Reality Creation) (trademark) scheme. The converter section 16 converts a video signal inputted from the A/D converter section 13 or double-speed converter 15 into a signal format (e.g. 1080I) with definition for display, and outputs the converted signal to an adjuster section 17.

The adjuster section 17 performs image quality adjustment on the signal converted by the converter section 16, and outputs the adjusted signal to and displays on a display 18.

Figure 3:
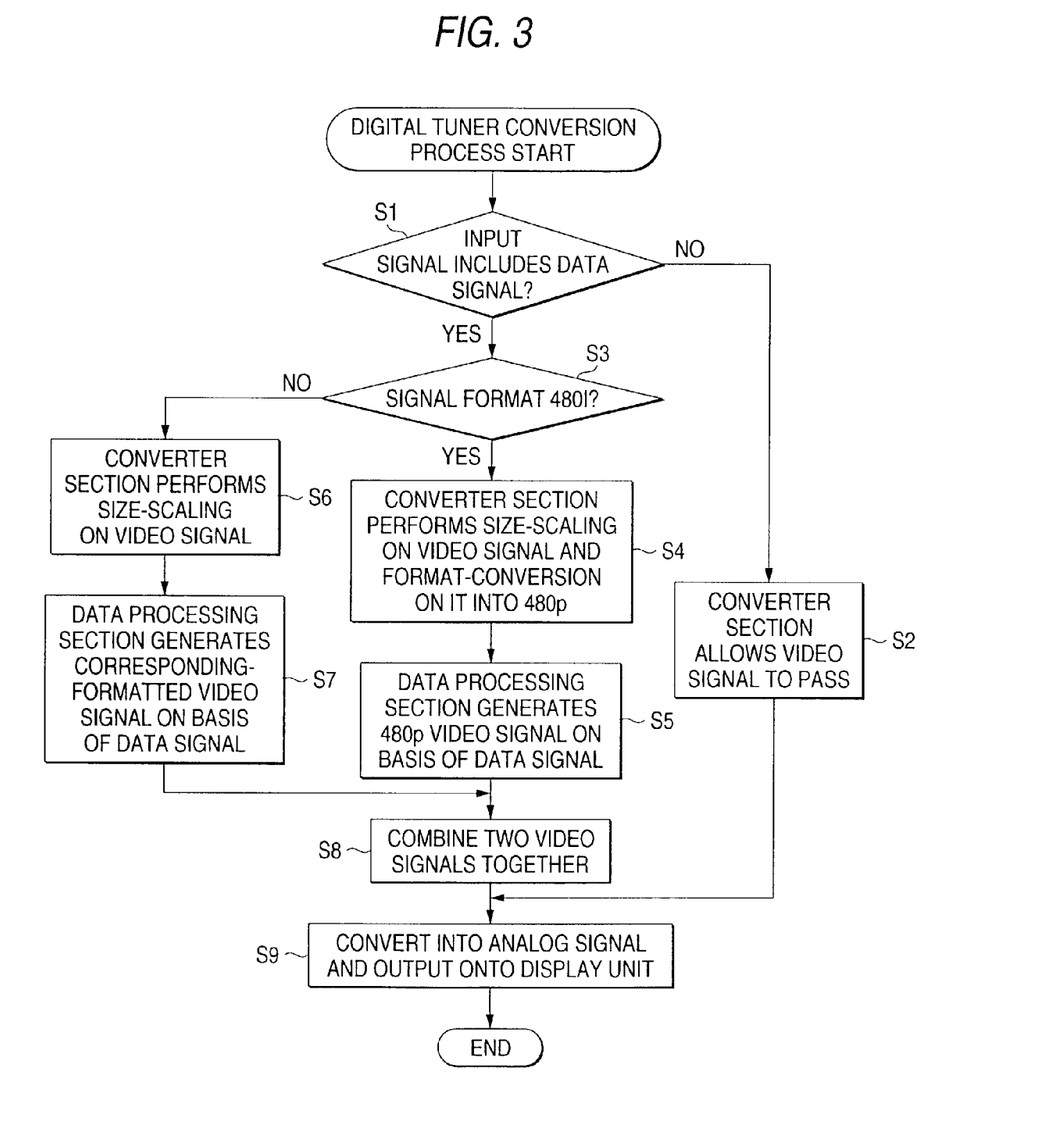
FIG. 3 is a flowchart explaining a process by a digital tuner of the television receiver of FIG. 2.

Next, explanation will be made on a process by the digital tuner 2, with reference to a flowchart of FIG. 3.

The PES packet data, outputted from the F/E section 4 and extracted by the demultiplexer 5, is supplied to the MPEG decoder section 6 where it is decoded. The decoded video signal is inputted to the converter section 8.

In step S1, the CPU 7 determines whether the reception signal configured by an image signal inputted to the converter section 8 contains a data signal or not, according to an information signal of the corresponding video signal inputted from the demultiplexer 5 or a user instruction signal inputted through the input section 9.

The information signal, where the corresponding reception signal contains a data signal, contains the information about a reduction size of the video signal. Accordingly, it is possible to determine whether the signal contains a data signal or not, according to a presence or absence of reduction-size information. Meanwhile, the input section 9 has a remote controller. For example, when the user presses the D-button in order to instruct for data broadcast reception, an instruction signal for data broadcast reception is outputted to the CPU 7. Due to this, the CPU 7 recognizes that the input signal contains a data signal.

Accordingly, in Step S1, the CPU 7, where determining that there is a video-signal reduction size in an information signal or where receiving an instruction signal by a user operation, determines that the reception and input signal is a signal containing a data signal. Thus, the process proceeds to step S3.

In step S3, depending upon an information signal on a signal format concerning the video signal inputted by the MPEG decoder section 6, the CPU 7 determines whether the video signal has a signal format of 480I or not. In the case of determining as 480I, the process proceeds to step S4.

In step S4, the CPU 7 controls the converter section 8 to perform size-scaling (size-reduction) on the data-broadcast video signal having a 480I signal format depending upon the reduction-size information contained in the information signal thereof, and convert it into a 480p signal format.

Furthermore, in step S5, the CPU 7 controls the data processing section 11 to generate a 480p video signal, such as of a corresponding character or figure, on the basis of the data signal corresponding to the converted video signal.

In the case that, in step S3, the signal format is not 480I (i.e. 480p, 720p or 1080I), the process proceeds to step S6.

In step S6, the CPU 7 controls the converter section 8 to carry out size-scaling without converting the video signal format. In step S7, the CPU 7 controls the data processing section 11 to generate a video signal of a corresponding formatted character or figure on the basis of the data signal.

After the process of step S5 or S7, the CPU 7 in step S8 causes the synthesizer section 10 to synthesize together the video signal processed by the converter section 8 and the video signal processed by the data processing section 11 and output the synthesized signal to the D/A converter 12.

In step S1, where determined that there is no video-signal reduction size in the information signal or no user instruction signal is received (i.e. determined that the video signal is of an ordinary broadcast), the process proceeds to step S2.

In step S2, the CUP 7 controls the converter section 8 to pass through and output the video signal to the D/A converter section 12. Namely, the ordinary-broadcast video signal(video signal not reduced in screen size) is not conversion-processed in the digital tuner but passed through the converter section 8 in a signal format without change and outputted to the D/A converter 12.

After processing step S2 or S8, the CPU 7 in step S9 controls the D/A converter 12 to convert a video signal outputted by the process of step S8 and a video signal outputted by the process of step S2 into analog signals, and outputs them onto the display unit 3.

However, there is a case that a 720p broadcast signal, where the display unit 3 is not compatible with the format or where in a superposed data broadcast, is converted into a 1080I signal and outputted onto the display unit 3.

As noted above, in the digital tuner 2, the 480I-formatted data-broadcast video and data signal only is converted into a 480p signal format. Due to this, the data-broadcast video signal is size-reduced to a half both in horizontal and vertical directions on the screen. However, because there are 480 vertical lines, despite a conversion process is made in the rear-staged converter section 16, the resolution in the vertical is almost maintained thereby suppressing against such image deterioration as step-formed slant lines.

Figure 4:
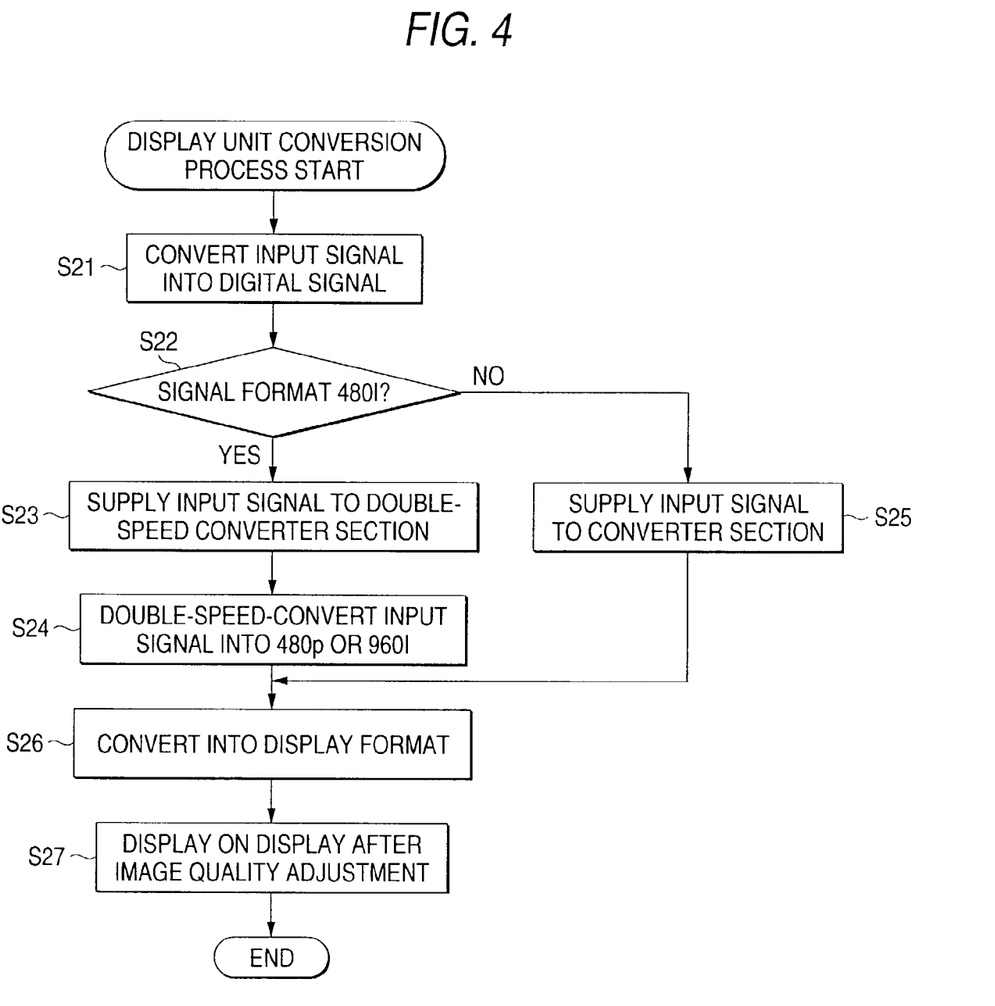
FIG. 4 is a flowchart explaining a process by a display unit of the television receiver of FIG. 2.

Next, explanation will be made on a conversion process in the display unit 3, on the basis of a flowchart of FIG. 4. Note that, although the processes are separately shown in FIGS. 3 and 4 for explanatory convenience, these processes are to be executed continuously.

In step S21, the A/D converter section 13 converts an analog signal inputted by the digital tuner 2 into a digital signal.

The CPU 14 in step S22 detects a signal format of a video signal inputted to the A/D converter 13, to determine whether it is in a 480I signal format or not. When determined as a 480I-formatted video signal, the process proceeds to step S23 to control the A/D converter section 13 and output a 480I video signal to the double-speed converter section 15. Incidentally, because the 480I-formatted data-broadcast video signal has been converted into a 480p signal in the digital tuner 2 of FIG. 3, the 480I-formatted video signal to be inputted to the double-speed converter section 15, in nature, comprises only a video signal (ordinary-broadcast video signal (720 dots×480 lines)).

In step S24, the CPU 14 controls the double-speed converter section 15 to convert the 480I video signal into a 480p or 960I double-speed signal (which one is according to a instruction by the user) and output the converted signal to the converter section 16.

In step S22, in the case that the video signal is determined not in a 480I signal format, the CUP 14 in step S25 controls the A/D converter section 13 to output a video signal to the converter section 16 instead of to the double-speed converter section 15.

In step S26, the CPU 14 controls the converter section 16 to convert a video signal outputted due to the process of step S24 or a video signal outputted due to the process of step S25 into a signal format for display (e.g. 1080I) and output it to the adjuster section 17.

In step S27, the CPU 14 controls the adjuster section 17 to perform image quality adjustment on the video signal converted by the converter section 16 and display of it on a display 18.

As described above, in the case of, among the signals inputted to the digital tuner 2, a 480I-signal-formatted data broadcast signal containing a data signal, the video signal in the digital tuner 2 is subjected to size-scaling and simultaneous conversion into 480p signal format but not double-speed-converted in the display unit 3. Accordingly, it is possible to suppress against such image deterioration as step-formed slant line-a, as shown in FIG. 1B.

Incidentally, in the above explanation, although the video signal was vertically and horizontally reduced in screen size down to a half size, when the video signal is greater in screen size than the half size for example, the conversion into a 480p signal results in a screen-size expansion of the video signal. Thus, no lines are thinned out.

Meanwhile, in the case of, among the signals received in the digital tuner 2, a 480I-formatted data broadcast signal containing a data signal, a character or figure data signal as an input signal (720 dots×480 lines) is converted into a 480p video signal in the digital tuner 2. This, in the display unit 3, is subjected to only frequency conversion in the converter section 16 and displayed without passing the double-speed converter section 15 for double-speed conversion. Accordingly, the resolution of 480p in signal nature can be maintained. Consequently, it is possible to suppress against the unnatural display conventionally occurred, e.g. line flicker in character-b as shown in FIG. 1B or excessive emphasis in edge-c as shown in FIG. 1B.

Furthermore, in the display unit 3, in the case of the image video signal (720 dots×480 lines) to be displayed on the 480I-formatted entire screen, because the signal is double-speed-converted in the double-speed converter section 15. Accordingly, the optimized image can be displayed as in the conventional.

Figure 5:
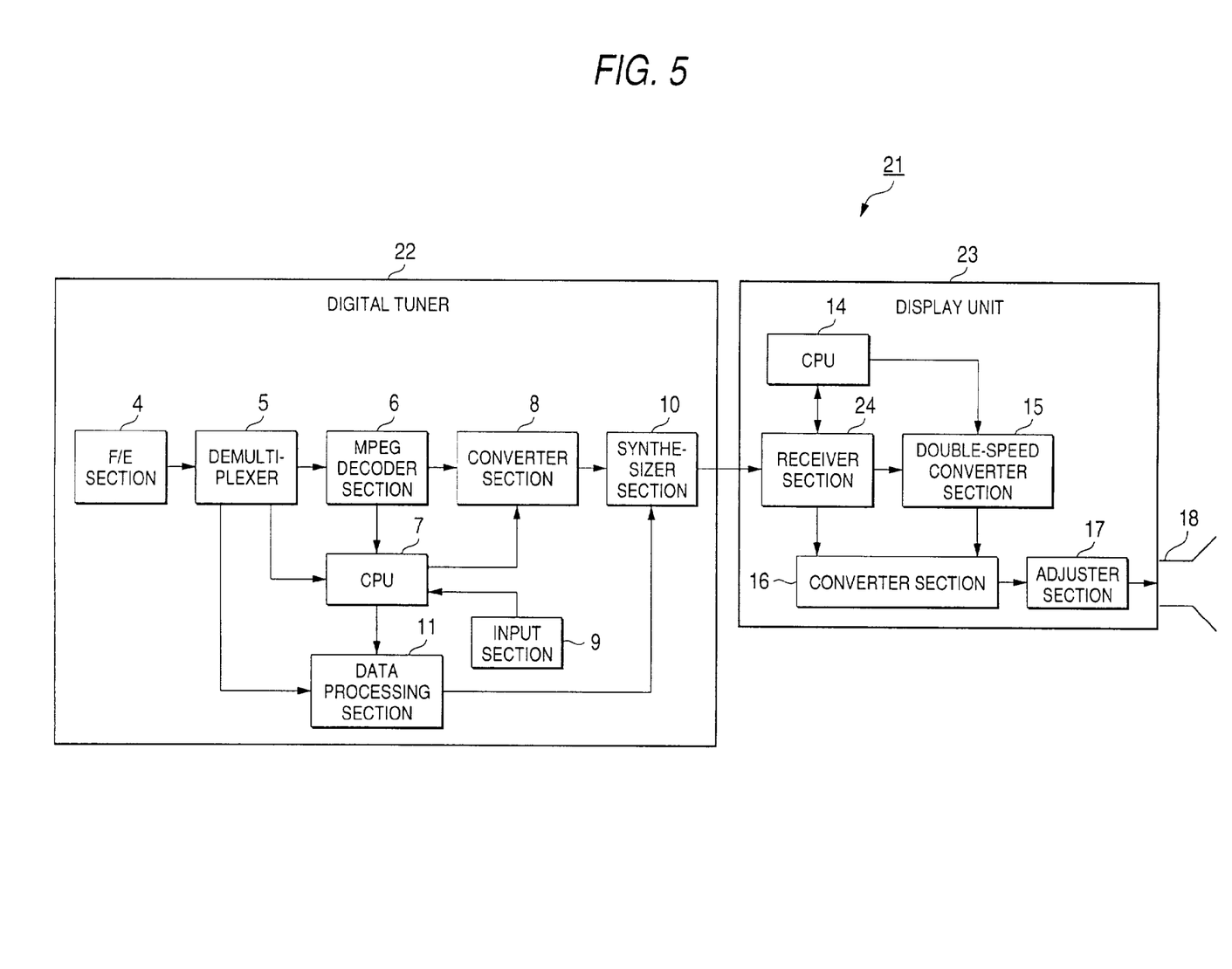
FIG. 5 is a diagram showing another configuration example of a television receiver to which the invention is applied.

FIG. 5 shows a configuration example of another television receiver to which the invention is applied. The television receiver 21, incorporating a digital tuner 22 and a display section 23 in an integral fashion, does not require D/A and A/D conversion. In this example, the digital tuner 22 in place of the digital tuner 2 of FIG. 2 and the display section 23 in place of the display unit 3 constitute the television receiver 21.

The digital tuner 22 is similar in configuration to the digital tuner 2 of FIG. 2 excepting in that the D/A converter section 12 is omitted. The display section 23 is similar in configuration to the display unit 3 of FIG. 2 excepting in that a receiving section 24 is added and the A/D converter section 13 is omitted. Note that, in FIG. 5, the parts corresponding to those of FIG. 2 are attached with the corresponding numerals whose explanations will be omitted because of duplication.

The digital tuner 22 has a synthesizer section 10 to synthesize together a video signal inputted from a converter section 8 and a video signal converted in a data processing section 11 and output the synthesized signal directly to a receiver section 24 of the display section 23.

The receiver section 24 of the display section 23 outputs a video signal inputted from the synthesizer section 10 to a double-speed converter section 15 or converter section 16, according to a determination by a CPU 14. The CPU 14 detects a signal format of a video signal and outputs a result of detection to the receiver section 24.

As in the above, the television receiver 21 does not require D/A and A/D conversion because of incorporating the digital tuner 22. This can suppress the signal deterioration due to the repetition of D/A and A/D conversions, as compared to the television receiver 1 of FIG. 2.

Figure 6:
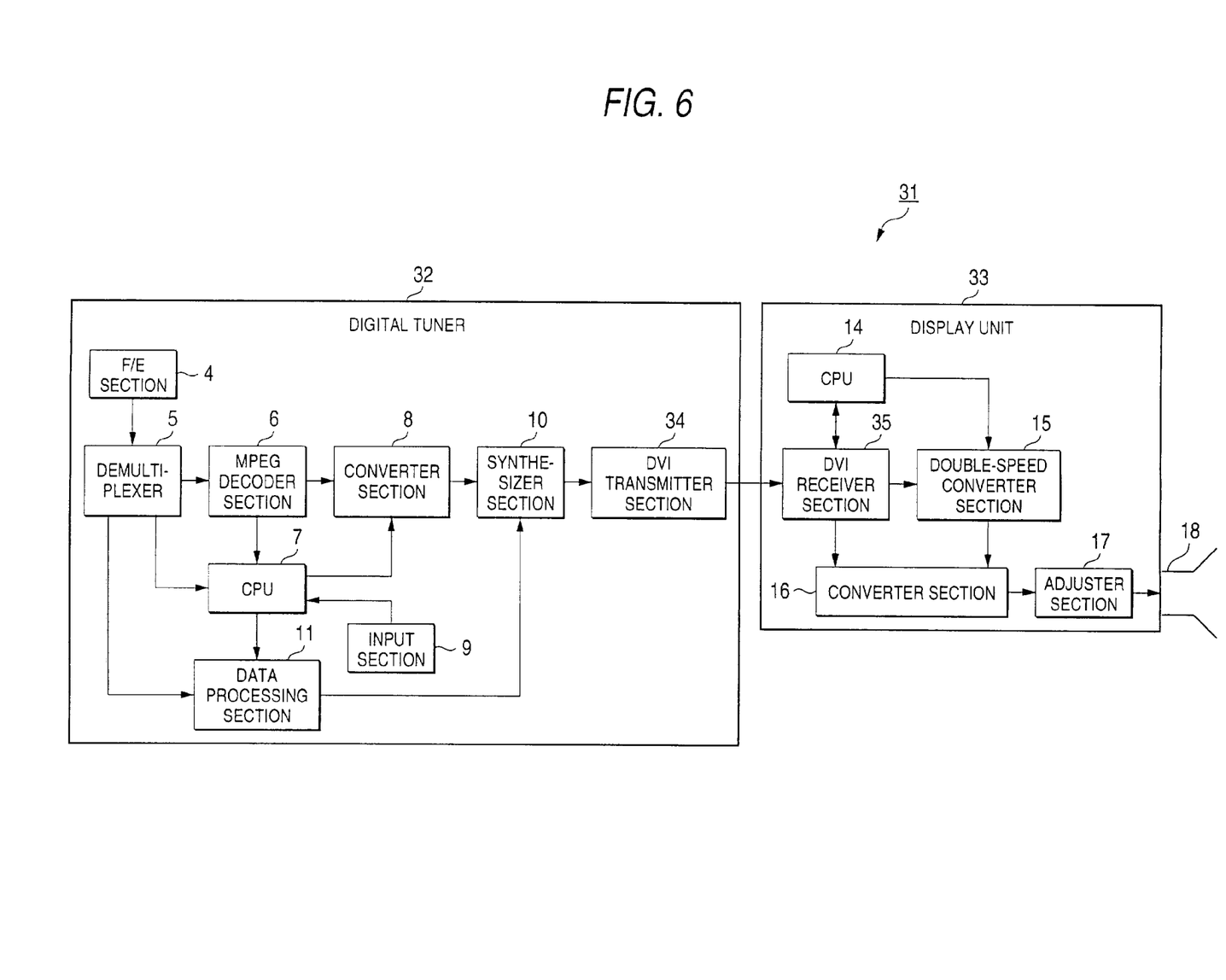
FIG. 6 is a diagram showing another configuration example of a television receiver to which the invention is applied.

FIG. 6 shows a configuration example of still another television receiver to which the invention is applied. This television receiver 31 is configured with a digital tuner 32 in place of the digital tuner 2 of FIG. 2 and a display unit 33 in place of the display unit 3. The digital tuner 32 and the display unit 33 are connected together by a DVI (Digital Visual Interface). There is no need to carry out D/A and A/D conversion, similarly to the television receiver 21 of FIG. 5. Meanwhile, the digital tuner 32 is configured as an STB or an SBB similarly to the digital tuner 2 of FIG. 2.

The digital tuner 32 is similar in configuration to the digital tuner 2 of FIG. 2 excepting in that a DVI transmitter section 34 is added and the D/A converter section 12 is omitted. The display unit 33 is similar in configuration to the display unit 3 of FIG. 2 excepting in that a DVI receiver section 35 is added and the A/D converter section 13 is omitted. Note that, in FIG. 6, the parts corresponding to those of FIG. 2 are attached with the corresponding numerals whose explanations will be omitted because of duplication.

The synthesizer section 10 of the digital tuner 32 synthesizes together a video signal inputted from the converter section 8 and a video signal converted by the data processing section 11 and outputs the synthesized signal to the DVI transmitter section 34.

The DVI transmitter section 34 outputs the video signal inputted by the synthesizer section 10 in a signal format of upon signal reception without change and as a digital signal without conversion into an analog signal, to the DVI receiver section 35.

The DVI receiver section 35 of the display unit 33 receives a video signal from the DVI transmitter section 34, and outputs the video signal to a double-speed converter section 15 or converter section 16 according to a determination by the CPU 14. The CPU 14 detects a signal format of a broadcast signal and outputs a result of detection to the DVI receiver section 35.

As in the above, in the television receiver 31, the digital tuner 32 and the display unit 33 are connected together by the DVI. Similarly to the television receiver 21 of FIG. 5, there is no need for D/A and A/D conversion. This makes it possible to suppress against the signal deterioration due to repetition of D/A and A/D conversions, as compared to the television receiver 1 of FIG. 2.

The above series of operations, although can be executed by hardware, can be executed by software. In this case, the television receiver 1, 21, 31 is configured by a television receiver 40 as shown in FIG. 7.

Figure 7:
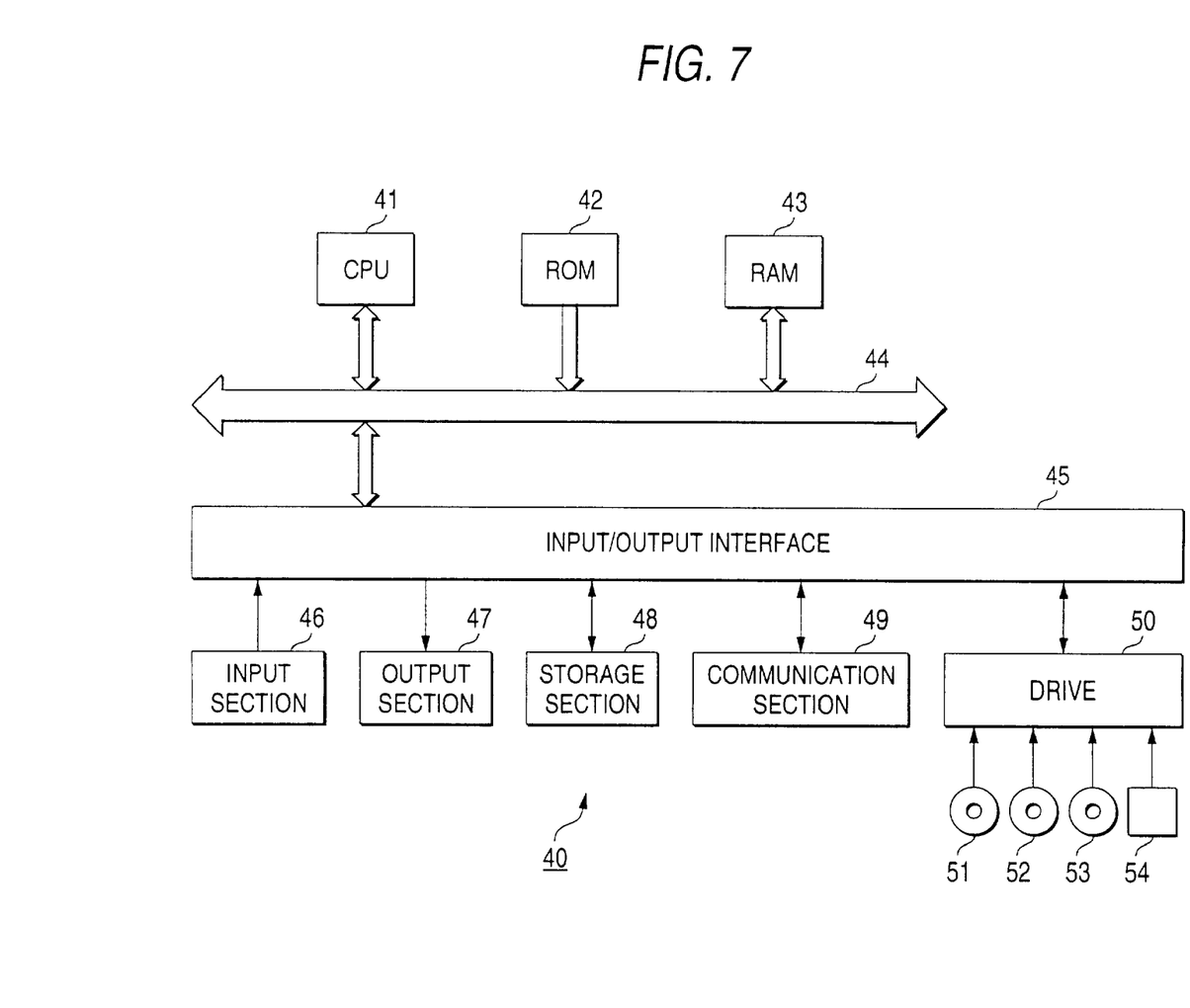
FIG. 7 is a diagram showing another configuration example of a television receiver to which the invention is applied.

In FIG. 7, a CPU (Central Processing Unit) 41 executes various processes according to a program stored in a ROM (Read Only Memory) 42 or a program loaded on a RAM (Random Access Memory) 43 from a strage section 48. The RAM 43 is also stored properly with the required data for the CPU 41 to carry out various processes.

The CPU 41, the ROM 42 and the RAM 43 are mutually connected through a bus 44. The bus 44 is also connected with an input/output interface 45.

The input/output interface 45 is connected with an input section 46 having a keyboard, a mouse or the like, a display having a CRT (Cathode Ray Tube), an LCD or the like, an output section 47 having a speaker or the like, a storage section 48 structured by a hard disk or the like, and a communication section 49 structured by a modem, a terminal adapter or the like. The communication section 49 carries out a communication process through a not-shown network.

The input/output interface 45 is also connected with a drive 50, as required, to properly mount thereon a magnetic disk 51, an optical disk 52, a magnetooptical disk 53 or a semiconductor memory 54. The computer program read out of the same is installed onto the storage section 48, as required.

In the case of executing a series of processes by software, the program configuring the software is installed from a network or recording medium to a computer built in exclusive hardware or, for example, a general-purpose personal computer capable of executing various functions due to installing various programs.

The recording medium, as shown in FIG. 7, is structured, separately from the apparatus main body, not only by a package media of a program-recorded magnetic disk 51 (including a flexible disk), optical disk 52 (CD-ROM (Compact Disk—Read Only Memory), DVD (including a Digital Versatile Disk)), a magnetooptical disk 53 (including MD (Mini-Disk) (trademark)) or a semiconductor memory 54 to be distributed for program supply to the user, but also by a program-recorded ROM 42 to be offered in a state being built in an apparatus main body to the user or a hard disk included in the storage section 48.

Incidentally, in the present description, the program-describing steps recorded on the recording medium naturally include sequential processes to be executed in the order of description. They also include the processes not necessarily to be executed sequentially but to be executed concurrently or individually.

What is claimed is:

1. A video signal processing apparatus for processing a video signal contained in an input signal and outputting a processed signal to a display unit having a control means, and a double-speed conversion means, said apparatus comprising:

separating means for separating from said input signal, a data signal representative of a character or a figure, and a reduced size signal representative of reduced size information;

first determining means for determining whether the input signal contains said data signal according to a presence of the reduced size information signal;

second determining means for determining whether a format associated with said video signal is a standard interlace format;

converting means for converting the format of the video signal to a progressive format in the case that the first determining means determines that the input signal contains the data signal and the second determining means determines that the format associated with the video signal is the standard interlace format, said converting means for outputting the input signal without converting the format in the case that the input signal does not contain the data signal; and synthesizing means for synthesizing the video signal format-converted by the converting means with a video signal based on a corresponding data signal;

wherein said control means of said display unit controls to input a synthesized signal from said synthesizing means to said double-speed conversion means in the case when the input signal does not contain the data signal and to pass through said double-speed conversion means in the case when the input signal contains the data signal.

2. The video signal processing apparatus according claim 1, further comprising data processing means for generating a progressive format signal on the basis of the data signal, and wherein the synthesizing means synthesizes the video signal format converted by the converting means with said progressive format signal of the data signal.

3. A video signal processing method for processing a video signal contained in an input signal and outputting a processed signal to a display unit having a control means, and a double-speed conversion means, said method comprising:

a separating step of separating from said input signal, a data signal representative of a character or a figure, and a reduced size signal representative of reduced size information;

a first determining step of determining whether the input signal contains said data signal according to a presence of the reduced size information signal;

a second determining step of determining whether a format associated with said video signal is a standard interlace format; a converting step of converting the format of the video signal to a progressive format when the first determining step determines that the input signal contains the data signal and the second determining step determines that the format associated with the video signal is the standard interlace format, and of outputting the input signal without converting the format in the case that the input signal does not contain the data signal; and a synthesizing step of synthesizing the video signal format-converted by the converting step with a video signal based on a corresponding data signal;

wherein said control means of said display unit controls to input a synthesized signal from the synthesizing step to said double-speed conversion means in the case when the input signal does not contain the data signal and to pass through said double-speed conversion means in the case when the input signal contains the data signal.

4. A storage medium readable by a computer having a program stored thereon the program for a video signal processing apparatus to process a video signal contained in an input signal and output a processed signal to a display unithaving a control means, and a double-speed conversion means, said program comprising:

a separating step of separating from said input signal, a data signal representative of a character or a figure, and a reduced size signal representative of reduced size information;

a first determining step of determining whether the input signal contains said data signal according to a presence of the reduced size information signal;

a second determining step of determining whether a format associated with said video signal is a standard interlace format;

a converting step of converting the format of the video signal to a progressive format when the first determining step determines that the input signal contains the data signal and the second determining step determines that the format associated with the video signal is the standard interlace format, and of outputting the input signal without converting the format in the case that the input signal does not contain the data signal; and a synthesizing step of synthesizing the video signal format-converted by the converting step with a video signal based on a corresponding data signal;

wherein said control means of said display unit controls to input a synthesized signal from the synthesizing step to said double-speed conversion means in the case when the input signal does not contain the signal and to pass through said double-speed conversion means in the case when the input signal contains the signal.

5. A storage medium readable by a computer having a program stored thereon for processing a video signal contained in an input signal and outputting a processed signal to a display unit having a control means, and a double-speed conversion means, said program comprising:

a separating step of separating from said input signal, a data signal representative of a character or a figure, and a reduced size signal representative of reduced size information;

a first determining step of determining weather the input signal contains said data signal according to a presence of the reduced size information signal;

a second determining step of determining whether a format associated with said video signal is a standard interlace format;

a converting step of converting the format of the video signal to a progressive format when the first determining step determines that the input signal contains the data signal and the second determining step determines that the format associated with the video signal is the standard interlace format, and of outputting the input signal without converting the format in the case that the input signal does not contain the data signal; and a synthesizing step of synthesizing the video signal format-converted by the converting step with a video signal based on a corresponding data signal;

wherein said control means of said display unit controls to input a synthesized signal from the synthesizing step to said double-speed conversion means in the case when the input signal does not contain the signal and to pass through said double-speed conversion means in the case when the input signal contains the signal.

6. A video signal receiver comprising:

a tuner section having separating means for separating from an input signal, a data signal representative of a character or a figure, and a reduced size signal representative of reduced size information; first determining means for determining whether the input signal contains said data signal according to a presence of the reduced size information signal; second determining means for determining whether a format associated with said video signal is a standard interlace format; converting means for converting the format of the video signal to a progressive format in the case that the first determining means determines that the input signal contains the data signal and the second determining means determines that the format associated with the video signal is the standard interlace format, and for outputting the input signal without converting the format in the case that the input signal does not contain the data signal; and synthesizing means for synthesizing the video signal format-converted by the converting means with a video signal based on a corresponding data signal and for supplying an output signal corresponding thereto; and a display unit having control means, and double-speed conversion means and being operable to receive the output signal from the tuner section, to cause the output signal to be input to said double-speed conversion means in the case when the input signal does not contain the data signal and to cause the output signal to pass through said double-speed conversion means in the case when the input signal contains the data signal, and to cause the same to be displayed on a display.

\* \* \* \* \*

UNITED STATES PATENT AND TRADEMARK OFFICE
CERTIFICATE OF CORRECTION

PATENT NO. : 7,324,742 B2 Page 1 of 1
APPLICATION NO. : 10/177519
DATED : January 29, 2008
INVENTOR(S) : Shinichiro Miyazaki It is certified that error appears in the above-identified patent and that said Letters Patent is hereby corrected as shown below:

On the title page, item [57], line 1 of the Abstract, "data," should read --data--;

Column 1, line 43, delete the word "upon";

Column 1, line 62, "character-bas" should read --character-b as--;

Column 2, line 57, delete the comma ",";

Column 3, line 14, delete the word "a";

Column 8, line 56, "magnetooptical" should read --magneto-optical--;

Column 9, line 4, "magnetooptical" should read --magneto-optical--;

Column 9, line 53, "according claim" should read --according to claim--;

Column 10, line 6, begin a new paragraph after the semi-color ";";

Column 10, line 28, "unithaving" should read --unit having--;

Column 11, line 1, "weather" should read --whether--.

Signed and Sealed this

Seventeenth Day of March, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,324,742 B2  
APPLICATION NO. : 10/177519  
DATED : January 29, 2008  
INVENTOR(S) : Shinichiro Miyazaki Page 1 of 1

It is certified that error appears in the above-identified patent and that said Letters Patent is hereby corrected as shown below:

On the title page, item [57], line 1 of the Abstract, "data," should read --data--;

Column 1, line 43, delete the word "upon";

Column 1, line 62, "character-bas" should read --character-b as--;

Column 2, line 57, delete the comma ",";

Column 3, line 14, delete the word "a";

Column 8, line 56, "magnetooptical" should read --magneto-optical--;

Column 9, line 4, "magnetooptical" should read --magneto-optical--;

Column 9, line 53, "according claim" should read --according to claim--;

Column 10, line 6, begin a new paragraph after the semi-colon ";";

Column 10, line 28, "unithaving" should read --unit having--;

Column 11, line 1, "weather" should read --whether--.

This certificate supersedes the Certificate of Correction issued March 17, 2009.

Signed and Sealed this

Nineteenth Day of May, 2009

JOHN DOLL  
*Acting Director of the United States Patent and Trademark Office*